United States Patent
Schlinker et al.

(10) Patent No.: US 7,114,323 B2
(45) Date of Patent: Oct. 3, 2006

(54) JET EXHAUST NOISE REDUCTION SYSTEM AND METHOD

(75) Inventors: Robert Schlinker, Canton, CT (US); Satish Narayanan, Ellington, CT (US); Wesley K. Lord, South Glastonbury, CT (US); Gregory A. Kohlenberg, Marlborough, CT (US); Ramons Reba, South Windsor, CT (US); John Simonich, Glastonbury, CT (US); Marios C. Soteriou, Middletown, CT (US); Thierry Maeder, Glastonbury, CT (US)

(73) Assignee: United Technologies Corporation, Hartford, CT (US)

( * ) Notice: Subject to any disclaimer, the term of this patent is extended or adjusted under 35 U.S.C. 154(b) by 82 days.

(21) Appl. No.: 10/794,968

(22) Filed: Mar. 5, 2004

(65) Prior Publication Data

US 2005/0193716 A1    Sep. 8, 2005

(51) Int. Cl.
*B63H 11/00* (2006.01)
*B64G 9/00* (2006.01)
*F02K 9/00* (2006.01)
*F03H 9/00* (2006.01)
*F23R 9/00* (2006.01)

(52) U.S. Cl. ............... 60/204; 60/770; 60/262; 60/725; 239/265.19; 181/213

(58) Field of Classification Search ........... 60/204, 60/228, 230, 232, 263, 770, 771, 725, 262, 60/264, 39.5, 226.1, 767; 239/265.19, 265.33, 239/265.39, 265.17, 265.13, 265.15, 265.25, 239/423; 181/213, 220, 206, 175, 196, 296, 181/400

See application file for complete search history.

(56) References Cited

U.S. PATENT DOCUMENTS

| 3,508,403 | A | * | 4/1970 | Neitzel ............... 60/226.1 |
| 3,568,782 | A |   | 3/1971 | Cox |
| 3,750,402 | A | * | 8/1973 | Vdoviak et al. .......... 60/762 |
| 4,045,957 | A | * | 9/1977 | DiSabato ............... 60/262 |
| 4,077,206 | A | * | 3/1978 | Ayyagari .............. 60/262 |
| 4,117,671 | A | * | 10/1978 | Neal et al. ............ 60/262 |
| 4,135,363 | A | * | 1/1979 | Packman .............. 60/262 |
| 4,149,375 | A | * | 4/1979 | Wynosky et al. ........ 60/262 |
| 4,175,384 | A | * | 11/1979 | Wagenknecht et al. ... 60/226.3 |
| 4,226,297 | A | * | 10/1980 | Cicon ................. 181/213 |
| 4,302,934 | A | * | 12/1981 | Wynosky et al. ........ 60/262 |

(Continued)

FOREIGN PATENT DOCUMENTS

GB       2207468 A   *   2/1989

(Continued)

*Primary Examiner*—William H. Rodriguez
(74) *Attorney, Agent, or Firm*—Wall Marjama & Bilinski LLP

(57) ABSTRACT

A system for reducing jet noise emission from an internally mixed gas turbine engine exhaust, comprising a fan/core flow mixer having a plurality of mixer lobes and a common flow nozzle having an equal number of tabs located along a circumferential edge of an aft end of the nozzle. There is a predetermined clocking relationship between the plurality of mixer lobes and the plurality of nozzle tabs that results in reduced exhaust noise emission, most evident in the lower frequency range. A method for reducing jet noise emission from an internally mixed gas turbine engine exhaust comprises selectively aligning a circumferential distribution of a mixed flow vorticity field produced by a fan/core mixer with a circumferentially distributed exhaust flow vorticity field produced by a modified common flow nozzle at an exit plane of the engine exhaust.

26 Claims, 13 Drawing Sheets

U.S. PATENT DOCUMENTS

| | | | |
|---|---|---|---|
| 4,487,017 A | * 12/1984 | Rodgers | 60/262 |
| 4,548,034 A | * 10/1985 | Maguire | 60/262 |
| 4,592,201 A | * 6/1986 | Dusa et al. | 60/262 |
| 4,786,016 A | * 11/1988 | Presz et al. | 244/130 |
| 4,813,230 A | * 3/1989 | Braithwaite | 60/262 |
| 4,819,425 A | * 4/1989 | Farquhar et al. | 60/226.1 |
| 5,775,095 A | * 7/1998 | Zysman et al. | 60/204 |
| 6,786,038 B1 | * 9/2004 | Lair | 60/226.1 |
| 6,804,948 B1 | * 10/2004 | Oishi | 60/262 |
| 6,813,877 B1 | * 11/2004 | Birch et al. | 60/226.1 |
| 2002/0073690 A1 | 6/2002 | Tse | |
| 2003/0115852 A1 | 6/2003 | Balzer | |
| 2003/0231777 A1 | * 12/2003 | Butler et al. | 381/71.3 |
| 2005/0138915 A1 | * 6/2005 | Bardagi et al. | 60/262 |

FOREIGN PATENT DOCUMENTS

| | | |
|---|---|---|
| GB | 2 372 780 | 9/2002 |

\* cited by examiner

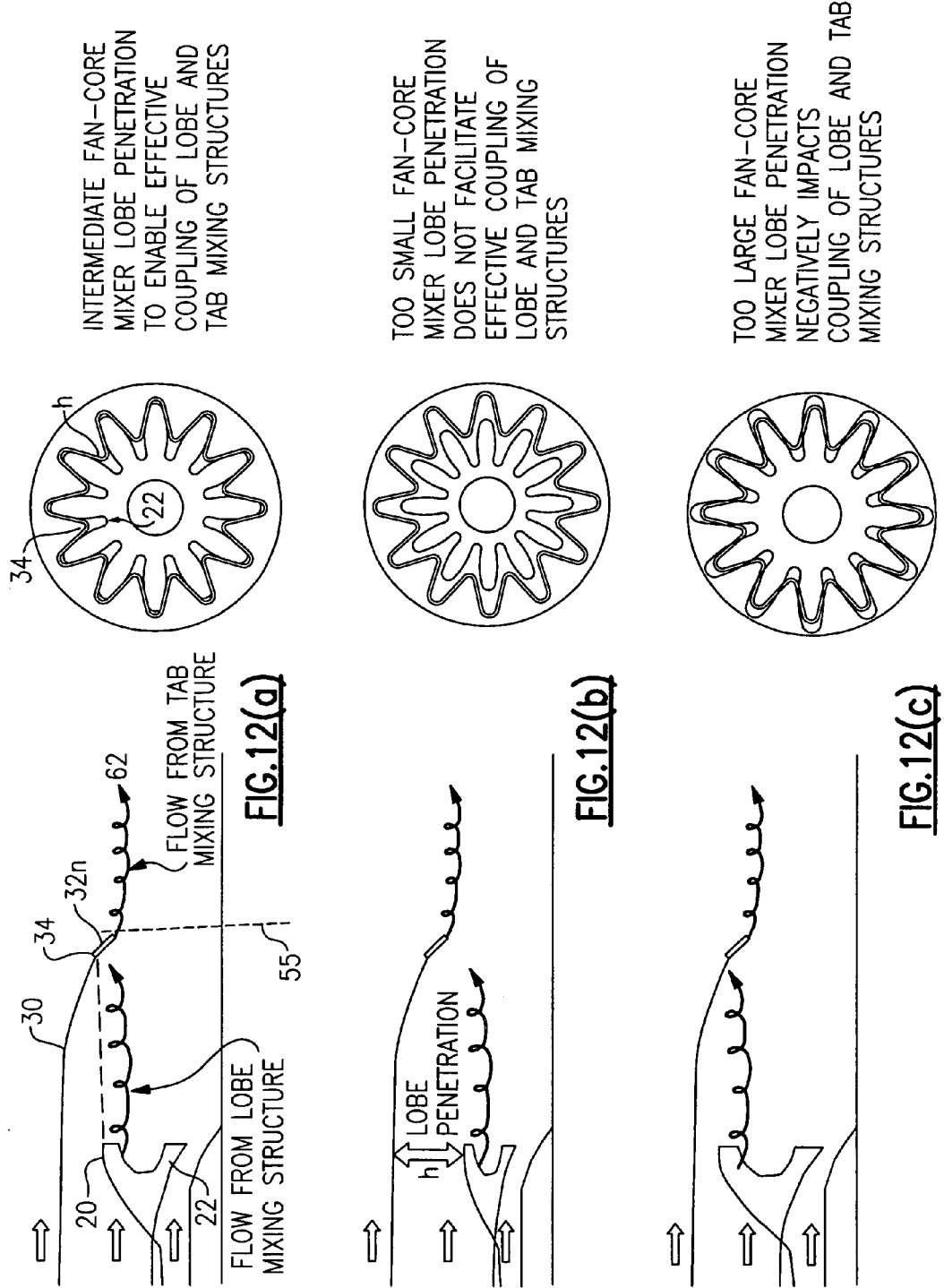

TAB TIPS ALIGNED
WITH MIXER LOBE PEAKS

TAB TIPS ALIGNED
WITH MIXER LOBE VALLEY

JET EXHAUST NOISE REDUCTION SYSTEM AND METHOD

BACKGROUND OF THE INVENTION

1. Field of the Invention

Embodiments of the invention are generally directed to gas turbine engine noise reduction and, more particularly, to a tandem system including an internal mixer and an exhaust nozzle modification, and an associated method, for effective flow stream mixing to reduce jet noise emission.

2. Description of Related Art

The generation of noise from turbulent jet exhaust is the dominant component of jet engine noise during aircraft takeoff. This noise presents public and environmental concerns and the reduction of jet noise emission continues to be a challenging problem.

Jet exhaust noise is created by the turbulent mixing of high velocity engine gases that emanate from the rear of a modern gas turbine. In large measure, it is the shearing forces between the high-velocity exhaust gases and the ambient air that produce the significant noise emission. Generally speaking, the jet noise generated by turbo fan engines is normally dominated by two sources: the fan or bypass flow and the primary or core flow. These two sources are concentric components that flow in axial streams out of the engine exhaust nozzle (tailpipe) to produce useful thrust.

Historically, engine designers have achieved jet noise reduction by decreasing engine exhaust velocities. This has led to passive approaches for reducing the peak velocity and temperature of exhaust plumes. For example, a lobe mixer concept has been used for long ducted, common flow exhaust systems for low bypass ratio engines such as those of the Pratt & Whitney JT8D engine family. Examples of lobe mixer systems and methods for turbine engine noise reduction are taught in U.S. Pat. Nos. 5,775,095 and 5,638,675, both of which are herein incorporated by reference in their entirety to the fullest extent allowed by applicable laws and rules. The '675 patent, for example, discloses a lobe mixer for a gas turbine engine that includes axially and radially extending chutes. The chutes act as gas conduits whereby relatively cool, low velocity fan air is directed into the chutes and in turn into the hot, higher velocity core gas flow. The lobe mixer thus increases the mixing of the core and fan bypass gases. The mixing reduces the internal flow/temperature gradients and the peak exhaust jet temperature and velocity. The flow undergoing mixing, as a result of the strong streamwise vorticity shed in the wake of the lobe mixer, evolves inside an extended tail pipe and exits from the tail pipe into the ambient environment. The reduced mixed velocity and temperature of the resulting exhaust results in a significant jet noise reduction.

In addition to the mixer concepts typical of common flow exhaust systems of low bypass ratio engines, noise reduction improvements have also been made to separate flow exhaust systems that are typical of moderate and high bypass ratio engine exhaust. These improvements have taken the form of tab-like projections or chevrons extending from the aft end of the tail pipe or exhaust nozzle. The teaching of these systems and methods can be found, for example, in U.S. Pat. Nos. 6,314,721 and 6,360,528, both of which are hereby incorporated by reference in their entirety to the fullest extent allowed by applicable laws and rules. The tabs or chevrons described therein are essentially geometric cutouts of the exhaust nozzle circumferential aft edge, such that triangular, trapezoidal, or other shaped tabs are distributed around the perimeter of the aft end of the nozzle. The spacing, periodicity, continuity, size, and shape of the tabs can vary as disclosed in the literature, along with the varying degree of inward or outward radial penetration of the tabs into the exhaust flow. These techniques, while creating a vorticity field downstream of the tab, lack any structure to create bypass flow streamwise vorticity for interaction farther upstream. U.S. Pat. No. 6,640,537, incorporated herein by reference in its entirety to the fullest allowable extent, teaches an exhaust shroud having multiple perforations and a tab-like trailing circumferential edge. The patent suggests that the exhaust shroud of the invention is applicable to a long cowl nacelle of a gas turbine engine that has a mixer device for mixing the combustion gases and the bypass airflow within the nacelle structure to improve thrust and reduce gas jet noise level. The present inventors have discovered, however, that the mere combination of internal mixer and external exhaust shroud modifications, without proper consideration of their relative placement and orientation may actually increase jet exhaust noise.

SUMMARY OF THE INVENTION

An embodiment of the invention is directed to a system for reducing jet noise emission from an internally mixed gas turbine engine. The system in its most general form includes the basic components of a gas turbine engine including, but not limited to, a fan having a plurality of rotor blades, a low-pressure compressor, a high-pressure compressor, a combustor, a high-pressure turbine, and a low-pressure turbine. A portion of the nacelle surrounding and partially enclosing the engine components at the downstream end will be referred to hereinafter as the engine exhaust nozzle. Various nozzle geometries are contemplated as being within the scope of the invention described herein, including, but not limited to, two dimensional exhaust tail pipes (see, e.g., FIG. 1), circularly symmetric tail pipes (and mixers) (see, e.g., FIG. 2), and other shapes or geometries known in the art. The embodiments of the invention particularly pertain to the combination of an internal fan/core flow mixer in operational engagement with a nozzle having a selectively, geometrically altered, peripheral aft end. The selective alteration of the nozzle relates to the size, shape, number, and orientation of the nozzle alteration and, particularly, to the clocking relationship (i.e., alignment) of the nozzle tabs with respect to the geometry of the mixer located upstream from the nozzle exit. In an aspect of the embodiment, the mixer is a lobe mixer having a periodic plurality of mixing structures referred to herein as lobes. The lobes create a mixed fan/core flow streamwise vorticity with a specific clockwise or counter clockwise flow rotation direction from each lobe. Standard lobe mixers have between 6 to 24 lobes, each characterized by a lobe major peak (with a chute extending radially farthest into the fan stream, as illustrated, e.g., in FIG. 6) and a lobe major valley (with a chute extending radially inward the most). In an aspect according to the embodiment, the lobe mixer is a double lobe mixer wherein each lobe major peak has a minor peak and a minor valley. According to the embodiment, the nozzle modification takes the form of a plurality of tabs that form the aft end circumferential edge of the nozzle after cutting out or otherwise reshaping the aft end of the nozzle. The farthest downstream portion of the tab is defined as the tab tip, and the farthest upstream portion at which the air can begin to exit the nozzle is known as the tab base. The tabs (as they will be referred to hereinafter) create a streamwise vorticity of the engine exhaust flow and also impart a rotation direction to the exhaust flow vorticies. The structures and corresponding flow streams are schematically illustrated in side view in FIG. 3 for clarity. In one aspect, the mixer lobes are contiguous and an equal number of corresponding nozzle tabs are also contiguous. The predetermined clocking relationship between the nozzle tabs and the mixer lobes provides that the alignment of the plurality of mixer lobes and the plurality of nozzle tabs is between a range of 0° to 360° where 0° and 360° represent a tab tip to lobe peak alignment and 180° represents a tab tip to lobevalley alignment. In an aspect, a tip or tip edge center of each tab is aligned with a corresponding lobe major peak of the mixer. Alternatively, the tip or tip edge center of each tab may be aligned with a corresponding lobe major valley of the mixer. In another alternative aspect, the tip or tip edge center of each tab may be aligned with a corresponding minor valley of each double lobe of a mixer. In another aspect, the tip or tip edge center of each tab may be aligned with a corresponding major valley of each double lobe mixer. According to an aspect of the embodiment, the nozzles tabs may protrude radially inward or radially outward within a predetermined range, and/or the mixer lobes penetrate radially inward with respect to the tab tips so that the vorticity introduced by the tabs is at a sufficient distance from the bypass flow vorticity in a nozzle exit plane.

Another embodiment according to the invention is directed to a method for reducing jet noise emission from an internally mixed gas turbine engine. The method involves selectively aligning a circumferential distribution of an internally mixed flow vorticity field with a circumferentially distributed engine exhaust flow vorticity field at or near an exit plane of an exhaust nozzle of the engine. An aspect of the embodiment includes clocking a plurality of nozzle tabs with a corresponding plurality of mixer lobes. Another aspect is directed to orienting a plurality of nozzle tabs in such a manner that they protrude radially within a predetermined range in relation to the radial penetration of the mixer lobes.

BRIEF DESCRIPTION OF THE DRAWINGS

FIGS. 12(a–c) are schematic illustrations used to demonstrate the effects of radial protrusion of tabs relative to varying amounts (small, intermediate and large) of lobe mixer radial penetration;

DETAILED DESCRIPTION OF A PREFERRED EMBODIMENT OF THE INVENTION

Figure 1:
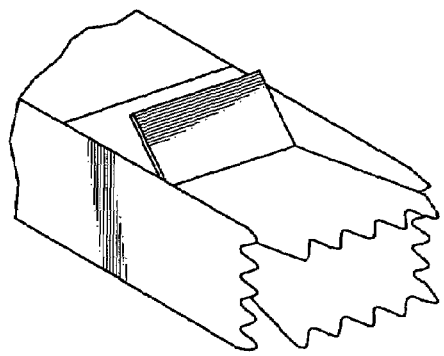
FIG. 1 is a schematic representation of a two-dimensional exhaust nozzle having a modified aft end as is known in the art.
Figure 2:
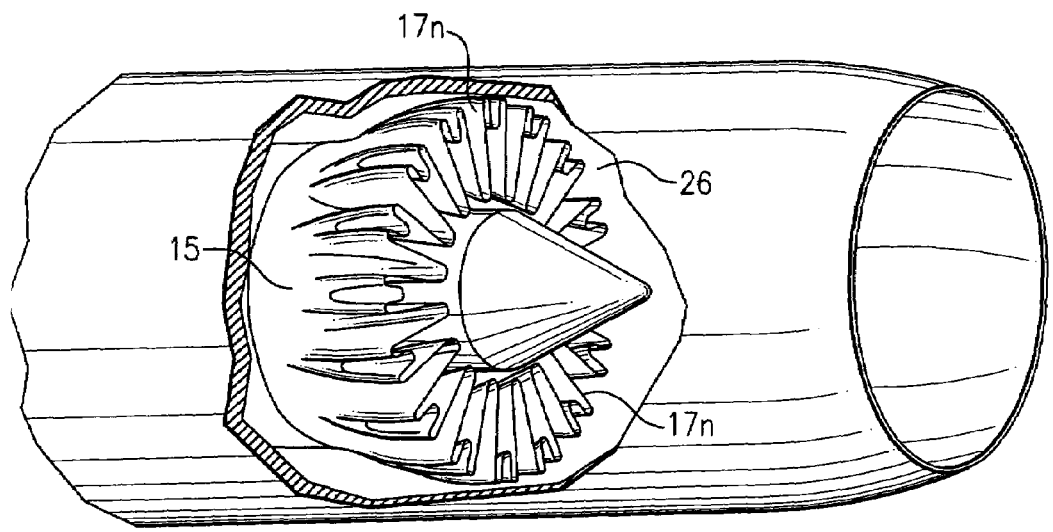
FIG. 2 is a view of the aft end of a turbo fan engine partly broken away, and showing a perspective view of a double lobe mixer as known in the art.
Figure 4A:
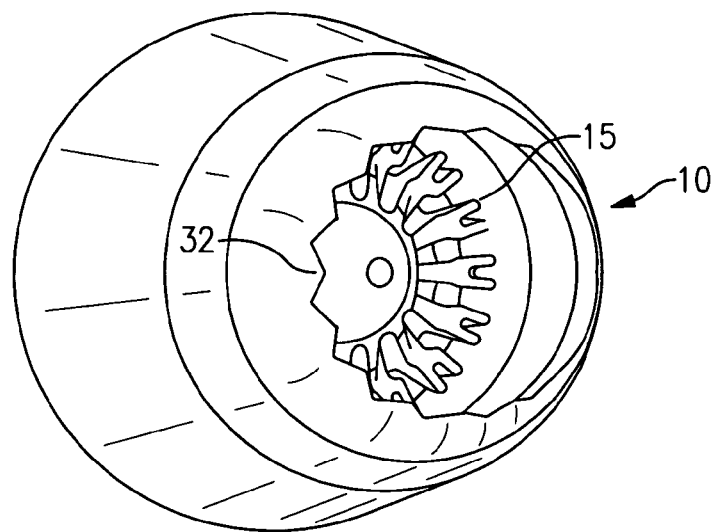
FIG. 4(a) is a photographic perspective view of a tandem system according to an embodiment of the invention, showing an internal double lobe mixer.
Figure 4B:
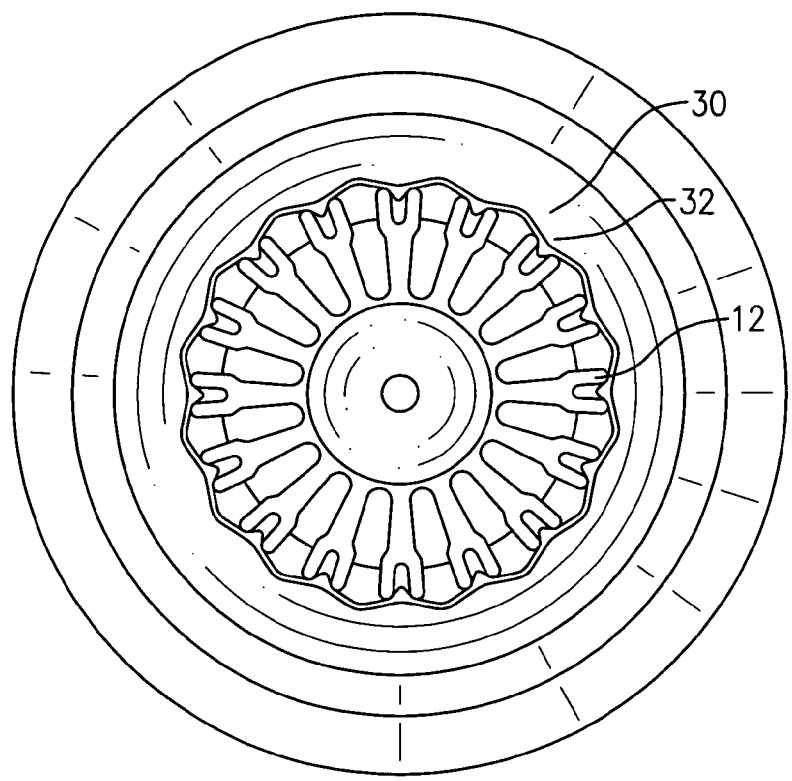
FIG. 4(b) is a photographic end view of the tandem exhaust system with tabs on tailpipe and double lobe mixer illustrated in FIG. 4(a)
Figure 5:
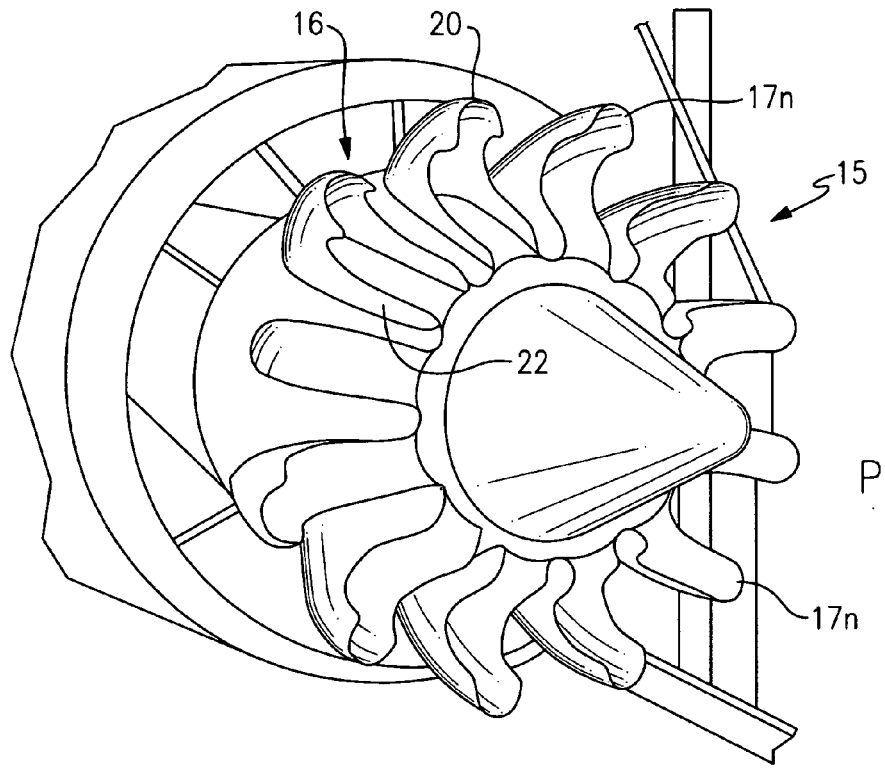
FIG. 5 is a 3D view of a jet turbine engine showing an internal single lobe mixer as known in the art.
Figure 9:
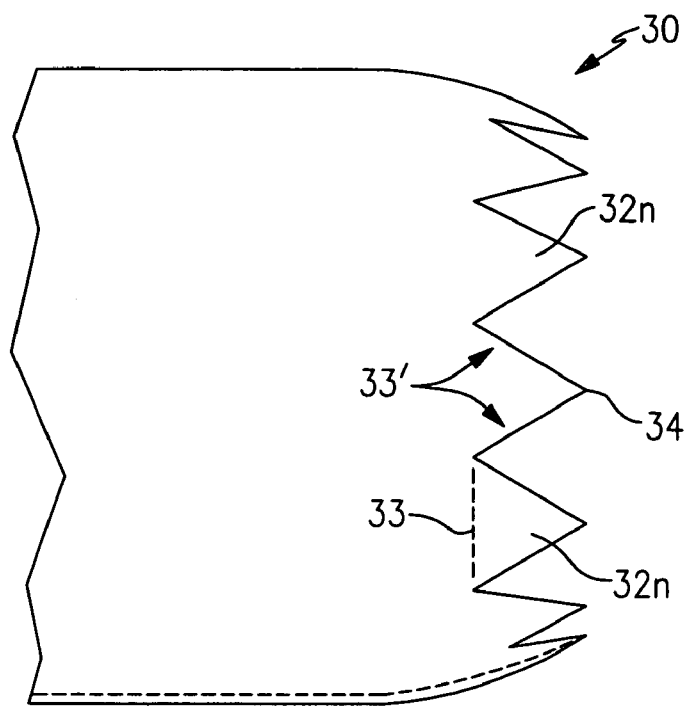
FIG. 9 is an axial side view, partly in section, of a portion of an engine exhaust nozzle modified with a tab geometry as is known in the art.

An embodiment of the invention is directed to a system 10 for reducing jet noise emission from an internally mixed gas turbine engine exhaust as illustrated by the photocopy views shown in FIGS. 4(a) and 4(b). The system includes a fan/core flow mixer 15 having a periodically configured series of mixer lobes $17_n$ each having a major peak 20 and a major valley 22, as illustrated in FIG. 5 for a conventional single-lobe mixer 16, and for a double-lobe mixer 26 as illustrated in FIG. 2. The mixer 15 is in operational combination with a common flow nozzle 30 whose aft end circumferential edge 12 has been geometrically modified as shown in FIG. 4(a) and FIG. 9. With reference to FIG. 9, the geometrical modification is in the form of a series of tabs 32n each having a base region 33 (encompassing a tab base) and a tip end 34. According to the embodiment, the number of mixer lobes $17_n$ is equal to the number of nozzle tabs $32_n$ and there is a predetermined clocking relationship between each of the mixer lobes $17_n$ and each of a respective nozzle tab $32_n$. The term "clocking relationship" as used herein refers to the alignment of an identified point of a corresponding tab nozzle (e.g., tab tip or tab base) with an identified point of the lobed mixer (e.g., lobe major peak, lobe major valley, lobe minor peak, lobe minor valley, etc.) as will be further described below. The particular clocking relationship, as opposed to a random mixer/exhaust tab orientation, has been shown to reduce noise emission levels as will be further illustrated below.

Figure 3:
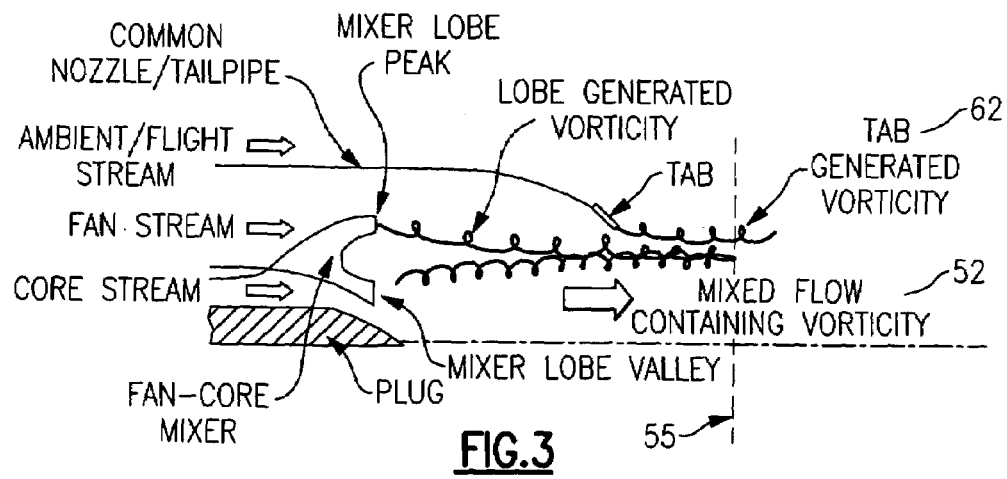
FIG. 3 is a cross-sectional line drawing of a system according to an embodiment of the invention to aid in the understanding of terminology used herein.
Figure 7A:
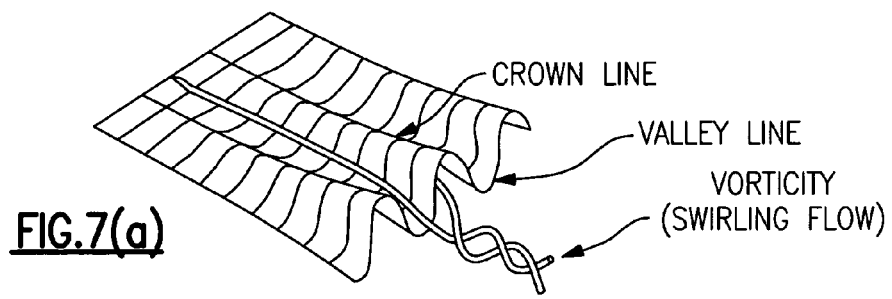
FIG. 7(a) is a schematic of a portion of the mixer "unwrapped" showing a crown (peak) flow and a valley flow and the resulting streamwise vorticity (or mixing flow structure) from a mixer lobe.
Figure 7B:
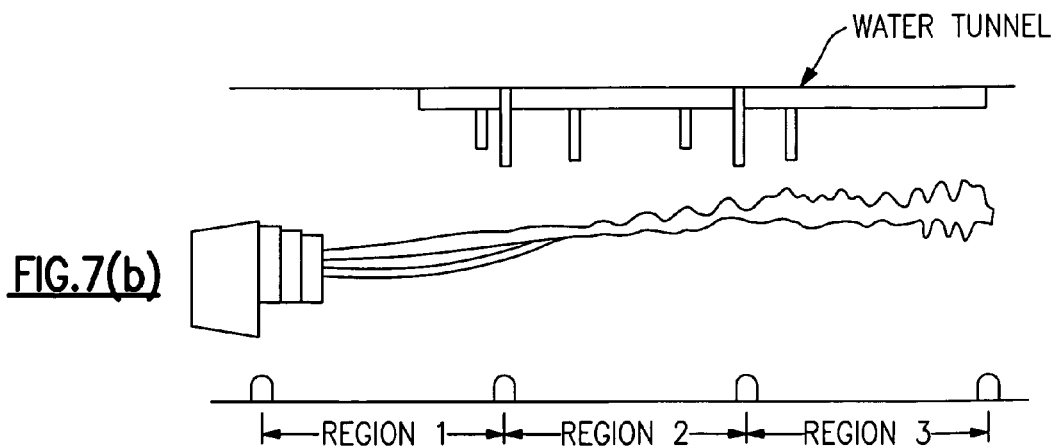
FIG. 7(b) is a photo reproduction of a mixer tested in a water tunnel with dye injected into the fan and core stream to show the swirling flow created by the vorticity, leading to mixing of the two streams.
Figure 8:
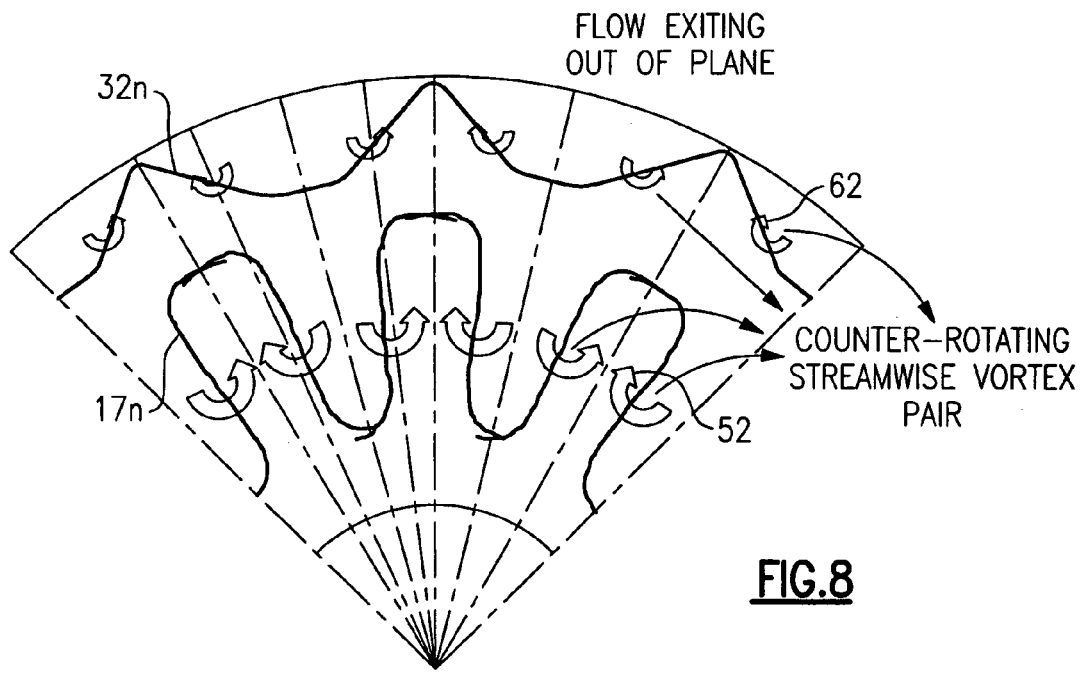
FIG. 8 is a schematic view of an exhaust flow field displaying a section of the fan-core mixer lobes, with the streamwise vortex structure sign and location, and the downstream exemplary exhaust nozzle exit geometry with the associated streamwise vortex structure sign and location, according to an embodiment of the invention.
Figure 10:
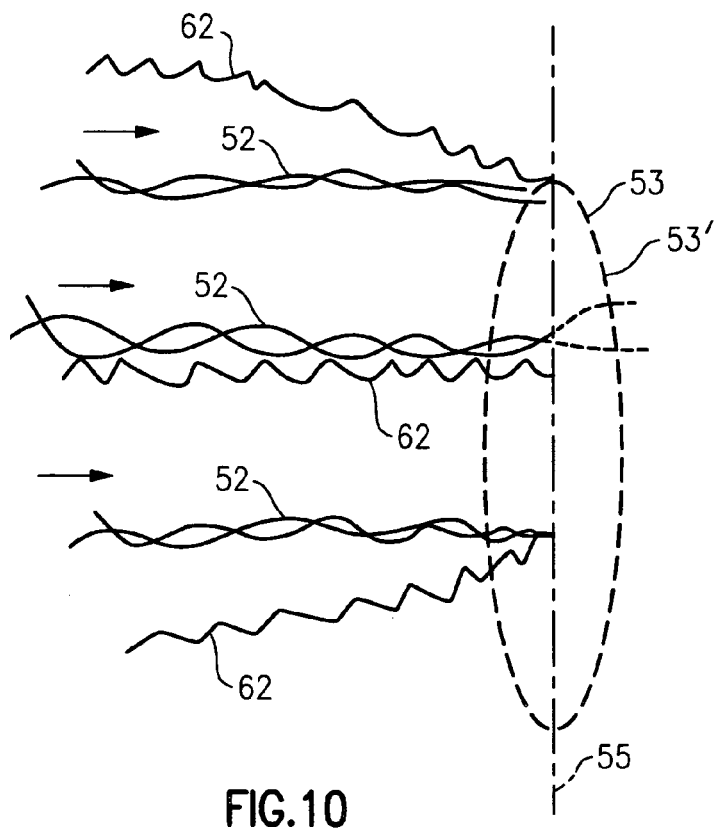
FIG. 10 is a schematic diagram illustrating an exhaust plane downstream of the exit and circumferential distribution of the mixed flow and core flow vorticity fields according to an embodiment of the invention.
Figure 11:
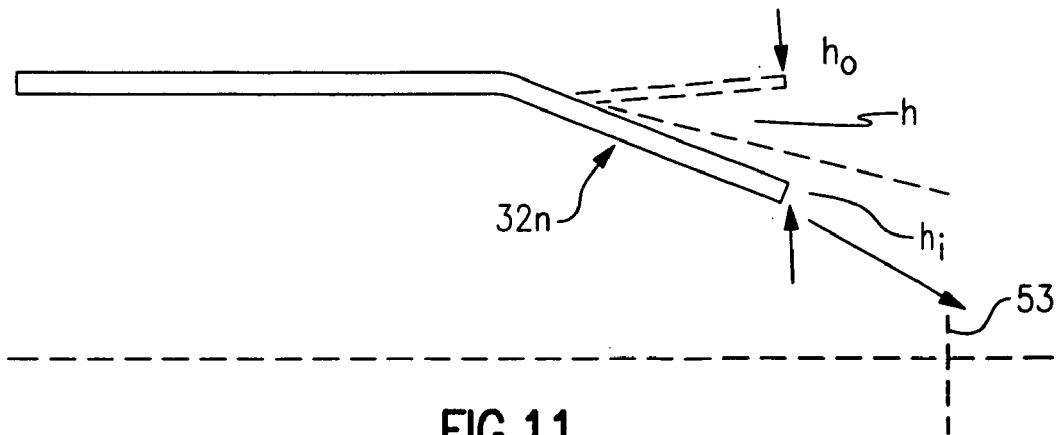
FIG. 11 is a side elevation view through one of the tabs illustrated in FIG. 9 illustrating the radial protrusion of the tab.

Exemplary embodiments according to the invention will be described with respect to circularly symmetric single-lobe and double-lobe mixers and corresponding circularly symmetric exhaust nozzles; however, the invention is not limited to circular geometries as will be appreciated by a person skilled in the art. Typical lobe mixers have between 6 to 24 lobes. Illustrative embodiments of the invention will refer to 12 lobe and 16 lobe mixers. As illustrated in FIGS. 5 and 6, for a conventional single-lobe mixer, each of the mixer lobes $17_n$ has a major peak 20 and major valley 22. As is known, the function of the mixer is to create a vorticity field (having embedded vortices with swirling flows) by combining the fan bypass flow field with the core stream flow field as illustrated in FIG. 7(a,b). Similarly, each nozzle tab $32_n$ protruding from the aft end of the exhaust nozzle 30 introduces streamwise vorticity in the engine exhaust flow 62 as illustrated in FIG. 3. FIG. 8 schematically illustrates an exhaust flow field in a plane showing the counter rotating streamwise vortex pairs 52 generated by the mixer lobes and the counter rotating streamwise vortex pairs generated by the exhaust nozzle tabs. Based upon the size, shape, radial lobe penetration, and other parameters of the mixer, the mixed flow 52 will have a circumferential distribution 53 at a measurable plane location 55 downstream of the exhaust exit, as illustrated in FIG. 10. Likewise, the nozzle tabs 32 will also produce a circumferentially distributed vorticity 53' at a plane 55 downstream of the exit. The size and location of the tab-induced vorticity distribution 53' can be controlled by appropriately shaping, sizing and radially orienting the nozzle tabs such that the circumferential distribution of the tab-induced vorticity 53' is substantially the same as the circumferential distribution of the internal mixed flow vorticity 53, in the plane 55 of the exhaust. As shown in FIG. 11, each of the tabs $32_n$ can be made to protrude over a radial range, h, between a radially outward pointing direction, $h_o$, and a radially inward pointing direction, $h_i$. In an exemplary aspect, the tabs $32_n$ protrude radially inward to align the tab-induced vorticity distribution with the mixed flow vorticity distribution in the exit plane 53 as described above. The size and location of the vorticity distribution at 53' can also be controlled by appropriate radial protrusions of the mixer lobes such that the radial location of the mixer lobe vorticity reaching 55 matches the radial location of the tab induced vorticity for their effective coupling. As shown in FIG. 12, each of the lobes (20) can be made to protrude over a radial range, h. In an exemplary aspect, the lobes protrude radially in an intermediate location to align the lobe vorticity distribution with the tab-induced vorticity distribution in the exit plane 53. FIG. 12(a–c) schematically illustrates the relationships between the mixer radial height parameter and the nozzle tab protrusion. In FIG. 12(a), each of the lobe peaks 20 are aligned with a corresponding tab base 34, and the mixer lobe major peak 20 has an intermediate penetration into the mixed flow stream for desired radial alignment of the mixed flow vorticity distribution and the tab nozzle vorticity distribution. FIGS. 12(b, c), respectively, illustrate a too small fan-core mixer lobe penetration resulting in an ineffective coupling of lobe and tab structures, and a too large fan-core mixer lobe penetration that negatively impacts coupling of the lobe and tab vortices.

Figure 6A:
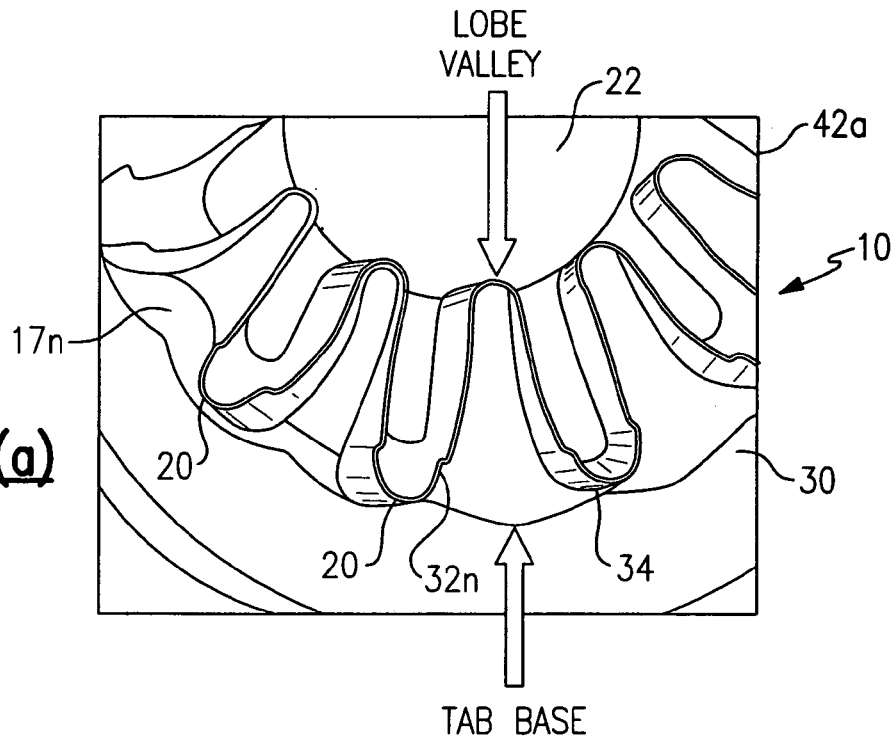
FIG. 6(a) is a photographic end view of a portion of a conventional single lobe mixer and exhaust nozzle configuration illustrating a clocking relationship according to an embodiment of the invention.
Figure 6B:
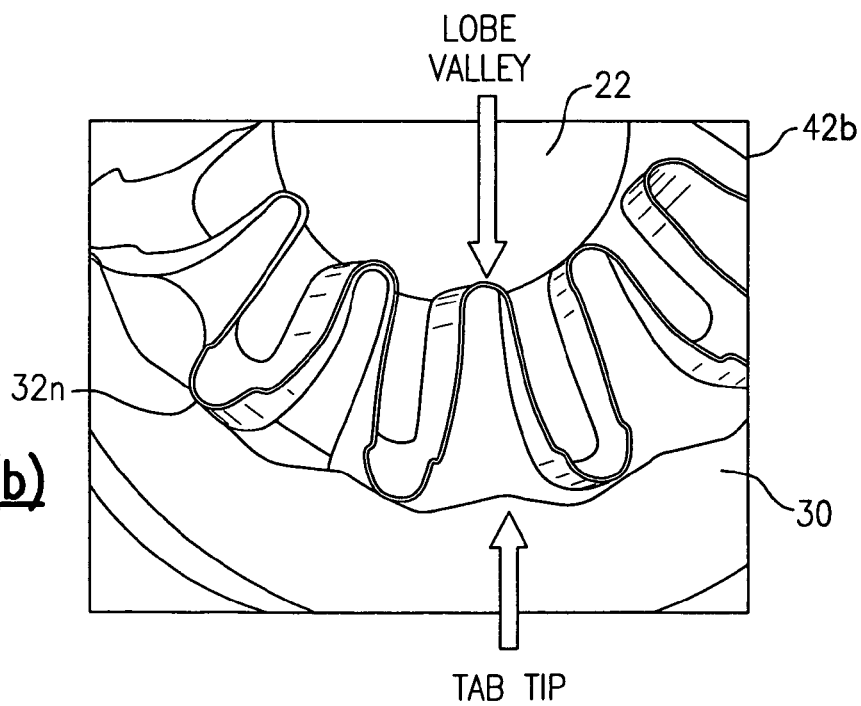
FIG. 6(b) shows an alternative clocking relationship of the tandem system of FIG. 6(a)

An exemplary embodiment according to the invention will now be described with reference to FIGS. 6 and 13. FIG. 6(a) shows a portion of a tandem conventional 12 lobe single-lobe mixer and nozzle tab configuration in a particular clocking relationship. Each of the tab tips 34 is aligned with a corresponding lobe major peak 20 (note that due to the close-up view, the described tab tip to lobe peak clocking relationship is apparent only at one tab-lobe pair). This tab tip to lobe peak clocking relationship is also shown in a schematic end view in FIG. 13(a) (clocking view 42(a)). In an alternative aspect of the exemplary embodiment, illustrated in FIGS. 6(b) and 13(c), a different clocking relationship 42(b) is illustrated in which each tab tip 34 is aligned with a lobe major valley 22. The two clocking relationships 42(a) (tab tip to lobe peak) and 42(b) (tab tip to lobe valley) may be thought of for illustration purposes in terms of a phase relationship of 0 degrees or 360 degrees for the tab tip to lobe peak case, and 180 degrees for the tab tip to lobe valley case. Thus, it is possible to align each tab tip 34 with some point of the mixer lobe between a tab tip to lobe peak or a tab tip to lobe valley orientation such as will produce a desired noise reduction effect. Accordingly, any predetermined clocking relationship described by a phase angle, β, where $0 \leq \beta \leq 360$ degrees is envisioned according to embodiments of the invention.

Figure 13A:
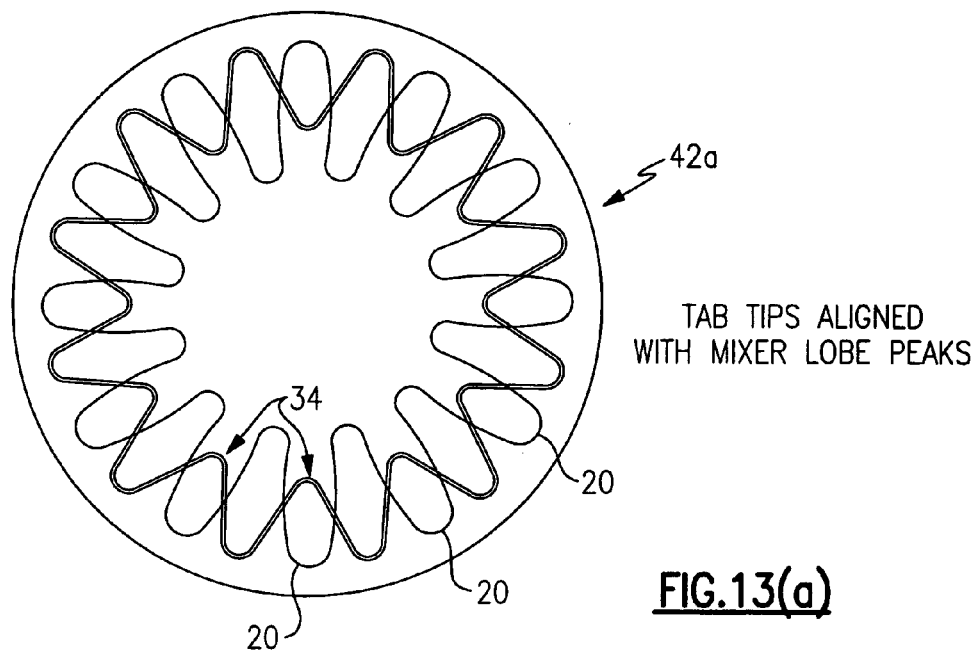
FIG. 13(a) is a schematic end view looking inward of a tandem mixer/nozzle clocking configuration according to an embodiment of the invention.
Figure 13C:
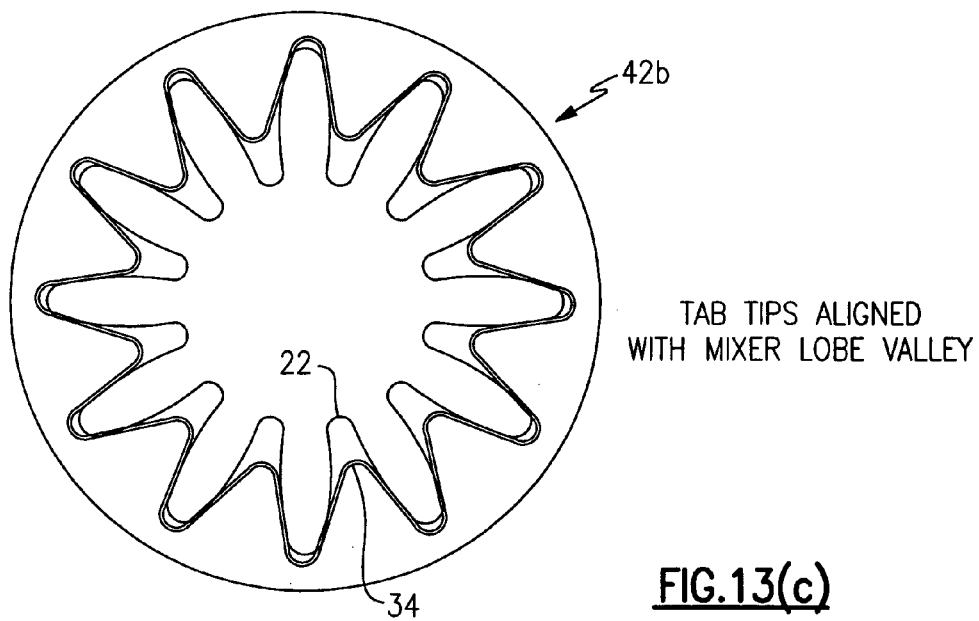
FIG. 13(c) is a view similar to that of FIG. 13(a) showing an alternative clocking arrangement.
Figure 13B:
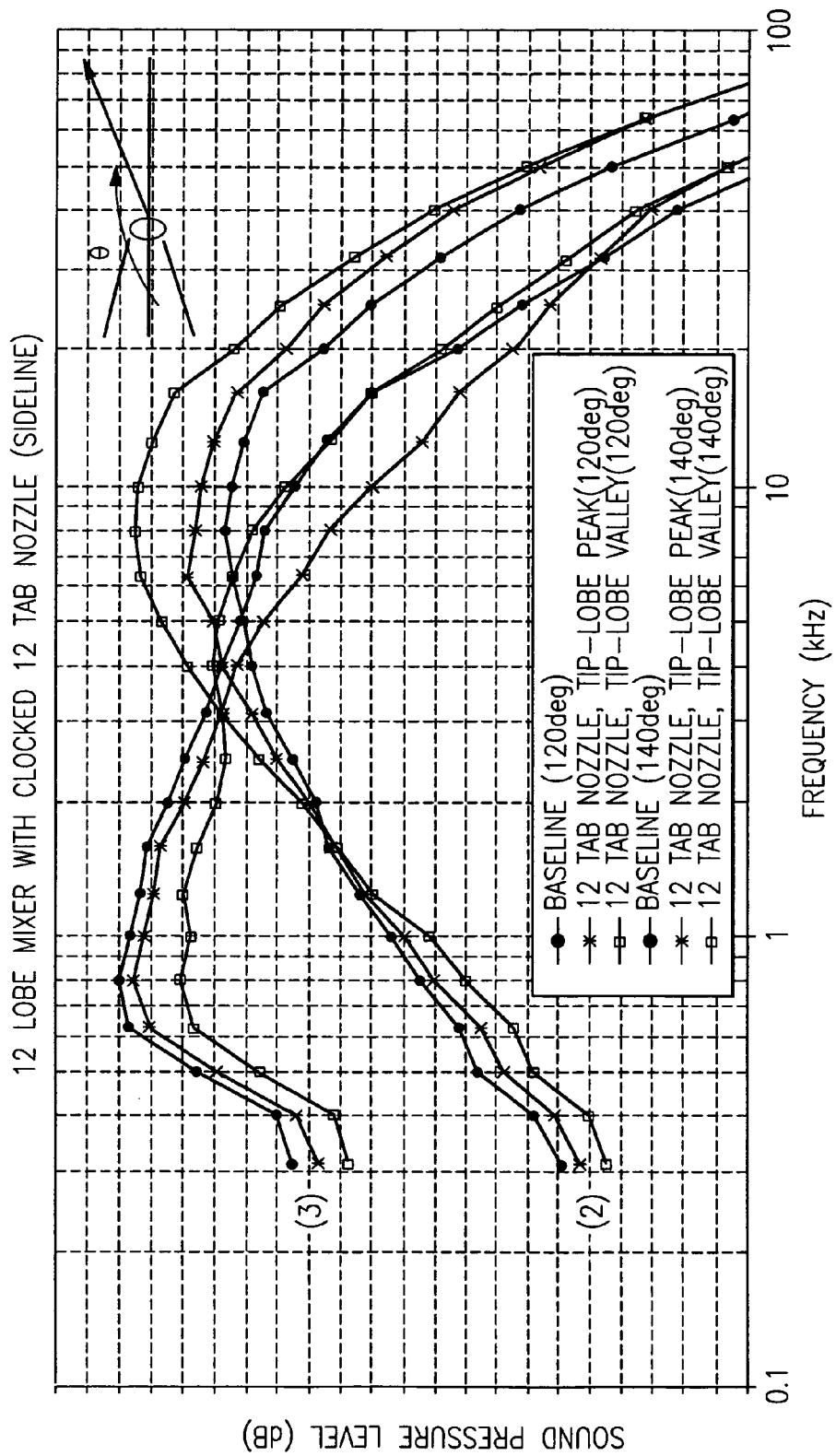
FIG. 13(b) is a graphical comparison of noise levels as a function of frequency for a 12-lobe/tab system according to an exemplary embodiment of the invention.
Figure 13D:
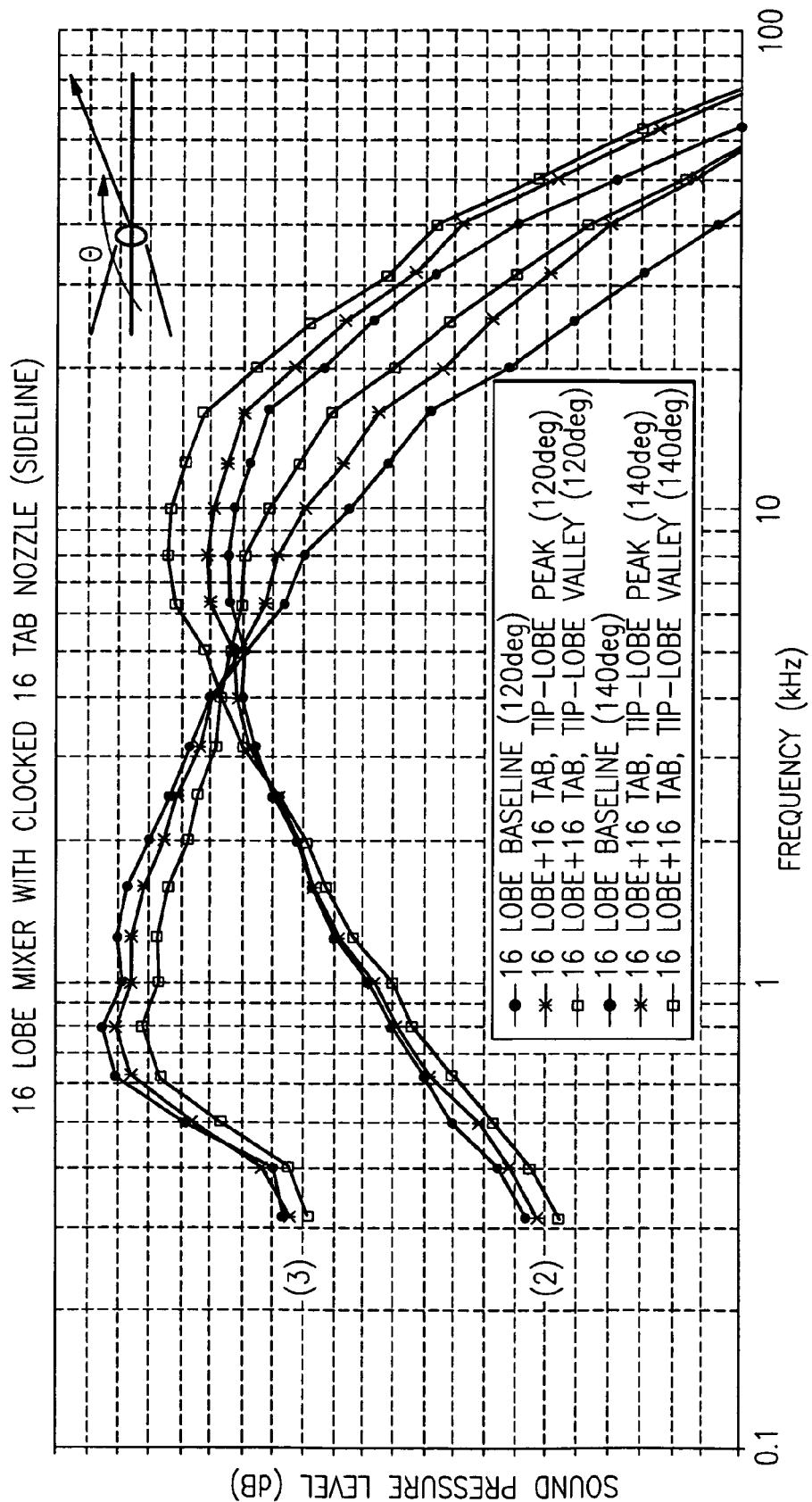
FIG. 13(d) is a graphical representation similar to FIG. 13(b) for a 16-lobe/tab system according to an exemplary embodiment of the invention.

FIG. 13(b) shows two sets of graphs (2,3) of measured far field sound pressure level in decibels (dB) as a function of frequency for a tandem system consisting of a 12-lobe mixer with a 12 tab nozzle according to an embodiment of the invention. Measurement data was generated under scale model acoustic testing conditions wherein microphone arrays were positioned at various locations around the exhaust system. The set of graphs represented by (2) and (3) of FIG. 13(b) show baseline data, tab tip to lobe peak clocking relationship data, and tab tip to lobe valley clocking relationship data for microphones placed at the 120 degree and 140 degree positions, respectively, as measured according to the angle θ in the insert of the upper right corner of FIG. 13(d). Here θ is measured from the upstream inlet axis of the engine. The data illustrate varying amounts of noise reduction in the lower frequency range of the exhaust noise emission, with the best-measured results obtained with the clocking relationship 42(b)); i.e., tab tips 34 aligned with lobe major valleys 22. FIG. 13(d) is a graph similar to that of FIG. 13(b) for a 16-lobe single-lobe mixer-nozzle tab tandem system according to an embodiment of the invention.

Figure 14A:
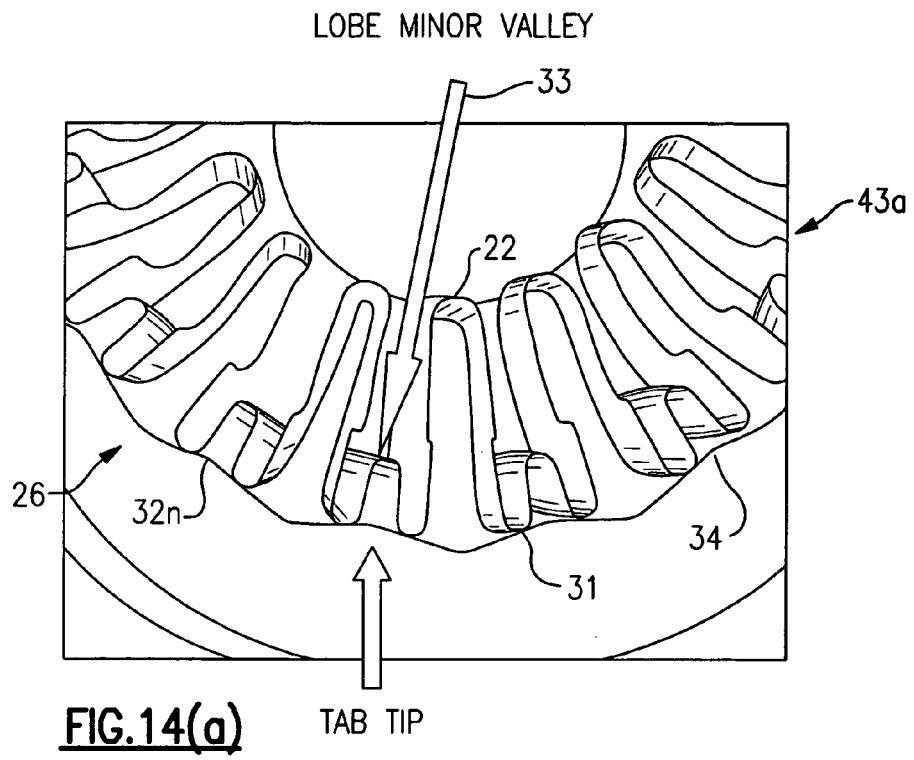
FIG. 14(a) is a photographic view of a double lobe mixer/nozzle system having an exemplary clocking relationship according to an embodiment of the invention.
Figure 14B:
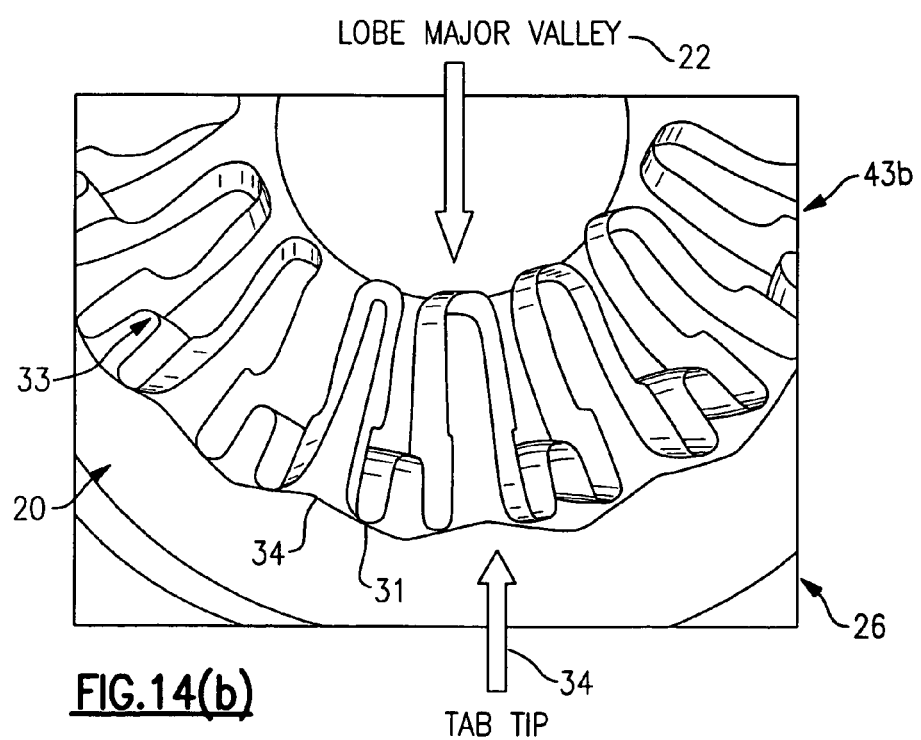
FIG. 14(b) shows an alternative clocking relationship of the tandem system shown in FIG. 14(a)
Figure 15A:
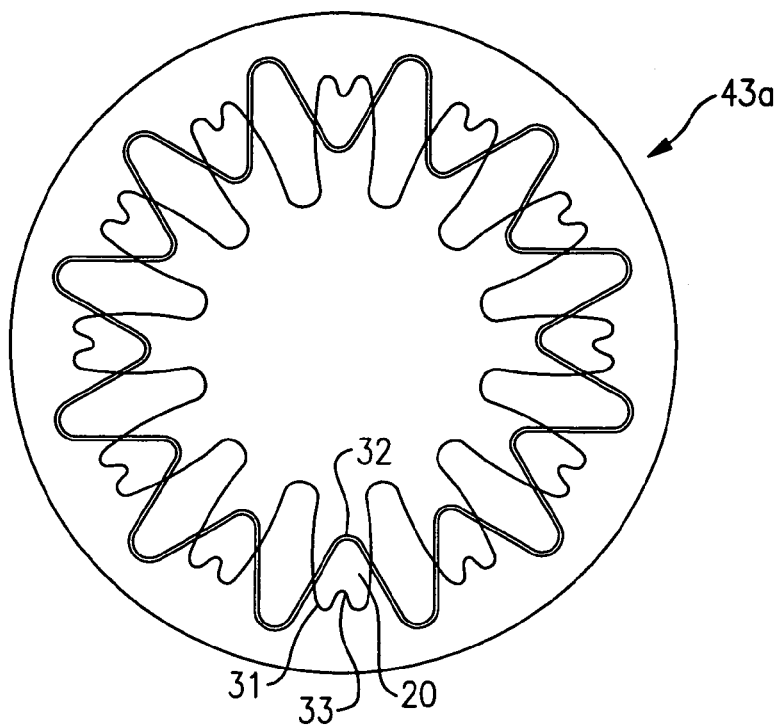
FIGS. 15(a–c) are figures similar to FIGS. 13(a–c) for a double lobe mixer according to an embodiment of the invention.
Figure 15B:
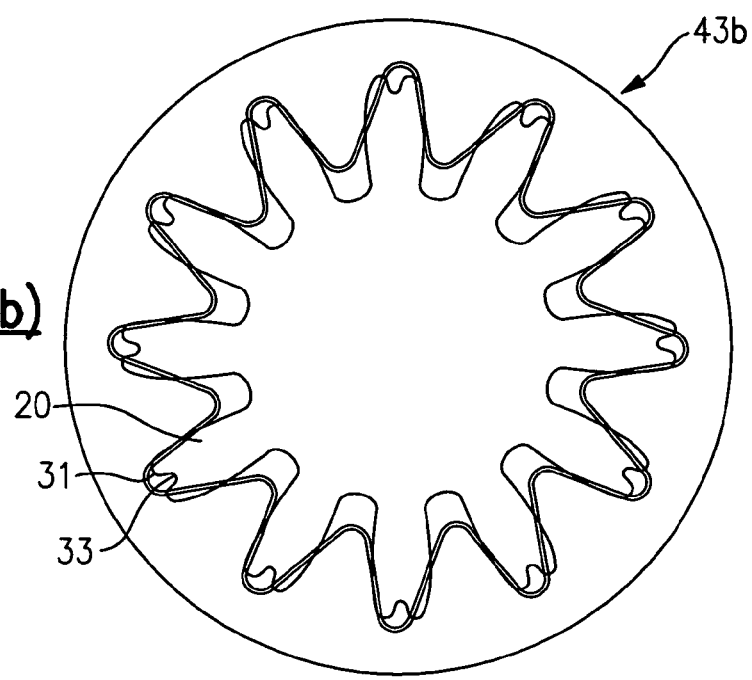
Figure 15C:
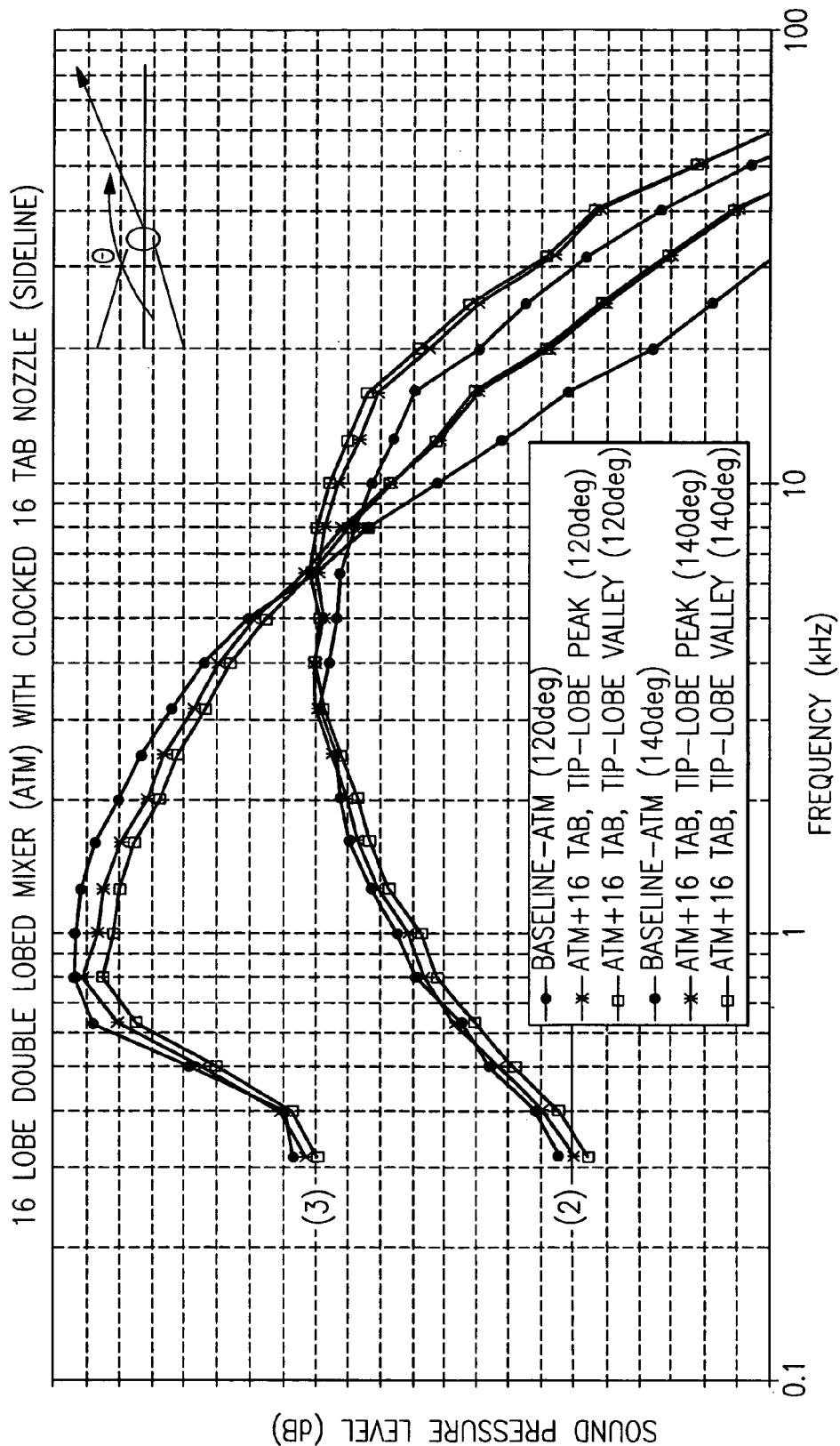

Another exemplary embodiment is illustrated with reference to FIGS. 14 and 15 wherein the mixer 26 is a 16-lobe double-lobe mixer. In the double-lobe mixer, each primary lobe has a major valley 22 as in the single-lobe mixer, but each major peak now has a minor valley 33 with adjacent minor peaks 31 as illustrated in FIGS. 14(a) and (b). In FIG. 14(a), each tab tip 34 is aligned with a lobe minor valley 33, illustrating clocking relationship 43(a). Alternatively, clocking relationship 43(b) is illustrated in FIG. 14(b) in which each tab tip 34 is aligned with a lobe major valley 22. These clocking relationships are further schematically illustrated in FIGS. 15(a) and (b), respectively. FIG. 15(c) is a graphical representation of sound level as a function of frequency similar to those of FIGS. 13(b) and (d). The measured data indicates that the best noise reduction performance was obtained with the clocking relationship 43(b) in which each tab tip 34 was aligned with a corresponding lobe major valley 22. In terms of a standardized measurement metric known in the art as the effective perceived noise level (EPNL), the exemplary clocking relationships using tab tip-lobe major valley alignment resulted in increased EPNL noise reduction of 1.8 dB compared to about 1.5 dB (for tab tip-lobe major peak alignment configuration). Similarly, upon using a tandem system comprising a conventional 12-lobe mixer with 12-tab nozzle, EPNL noise reduction of 0.3 dB was obtained for the tab tip-lobe major valley alignment configuration, in contrast to 0–0.2 dB increase for the tab tip-lobe major peak alignment case.

According to an embodiment of the invention, jet exhaust noise is reduced by matching a circumferential distribution of tab nozzle induced vorticity fields with the circumferential distribution of mixer-induced vorticity fields, particularly in a common exhaust exit plane. The flow field distributions are achieved, respectively, by a tandem system including an internal lobed mixer and a geometrically altered exhaust nozzle aft end in the form of axially protruding tabs when a particular clocking relationship between the tab tips and the mixer lobes is provided. The tab parameters are selected in relation to the number and alignment of the plurality of mixing structures of the mixer such that the direction of rotation of the nozzle induced tab nozzle streamwise vorticity either substantially matches or opposes the direction of rotation of the mixer induced streamwise vorticity at a given circumferential location in an exit plane of the nozzle exhaust. Accordingly, the mixer induced-streamwise vorticity and the tab nozzle-induced streamwise vorticity are aligned in circumferential location in a desired exit plane location of the tail pipe. The method of specifically clocking nozzle tab alignment with mixer lobe structures has demonstrated measurable noise emission reduction according to an industry standard metric. The effectiveness of coupling of the mixer induced and tab nozzle induced streamwise clocking also requires an intermediate radial location for the mixer lobe protrusion to ensure that the two vorticity fields couple at the same radial location downstream of the nozzle exist plane.

The foregoing embodiments and aspects of the invention are disclosed herein by way of examples only and are not intended to limit the scope of the present invention, which is solely defined by the appended claims. A person of ordinary skill in the art will appreciate many variations and modifications within the scope of this invention.

We claim:

1. A system for reducing jet noise emission from an internally mixed gas turbine engine exhaust, comprising:
   a double-lobe mixer used for mixing a core flow and a bypass fan flow, said mixer having a plurality of mixer lobes each having a major peak and a major valley; and
   an exhaust flow nozzle having a plurality of triangular tabs each having an upstream base end and a downstream tip or tip edge center end, located along a circumferential edge of an aft end of the nozzle,
   wherein there is a predetermined clocking relationship between the plurality of mixer lobes and the plurality of nozzle tabs.

2. The system of claim 1, wherein there is an equal number of mixer major lobes and nozzle tabs, and the predetermined clocking relationship provides that each of the lobe major peaks is axially aligned with a respective tab tip.

3. The system of claim 1, wherein the predetermined clocking relationship provides that each of the mixer lobe major valleys is aligned with a respective tab tip.

4. The system of claim 1, wherein the predetermined clocking relationship provides that the alignment of the plurality of mixer lobes and the plurality of nozzle tabs is between a range of 0° and 360°, where 0° and 360° represent a tab tip to lobe peak alignment and 180° represents a tab tip to lobe valley alignment.

5. The system of claim 1, wherein the mixer is a conventional lobe mixer.

6. The system of claim 5, wherein the mixer has a lobe count in the range between 6 to 24 lobes.

7. The system of claim 1, wherein each major peak includes a minor peak and a minor valley.

8. The system of claim 7, wherein the tip of each tab is aligned with the minor valley of each respective major peak.

9. The system of claim 7, wherein the tip of each tab is aligned with the major valley of each respective mixing structure.

10. The system of claim 7, wherein the double-lobe mixer has a lobe count in the range between 6 to 24 lobes.

11. The system of claim 1, wherein each of the plurality of lobes radially penetrates within a selected range relative to a radial tab protrusion.

12. The system of claim 1, wherein each of the plurality of tabs has a leading edge integral with the circumferential edge of the aft end of the nozzle, at least two side edges, and a tip edge, which define a shape of the tab, the shape being selected from one of a triangle, a trapezoid, or a shape having smooth, continuous corners, further wherein the tip edge is a point, a flat edge, a curved edge, or a plurality of shaped edges.

13. The system of claim 11, wherein the double lobe mixer produces a mixed flow having a circumferential distribution located in a plane of the exhaust, the nozzle tab orientation being aligned with said circumferential location.

14. The system of claim 13, wherein the nozzle produces streamwise vorticity in an external exhaust stream, and further wherein the internal mixed flow streamwise vorticity and the tab nozzle-induced streamwise vorticity are aligned in circumferential location at a desired exit plane of the exhaust.

15. A method for reducing jet noise emission from an internally mixed gas turbine engine exhaust, comprising:
   providing an internally mixed gas turbine engine including double-lobe mixer used for mixing a core flow and a bypass fan flow, and an exhaust nozzle having a geometrically modified aft end protrusion which includes a plurality of triangular tabs with each having an upstream base end and a downstream tip end;
   generating via the flow mixer streamwise vorticity at a given circumferential location in an exit plane of the exhaust; and
   generating via the geometrically modified aft end protrusion an exhaust flow streamwise vorticity at the given circumferential location in the exit plane of the exhaust and in the external domain extending downstream of the nozzle exit.

16. The method of claim 15, wherein generating the exhaust flow vorticity at the given circumferential location in the exit plane of the exhaust comprises orienting a plurality of the tabs in a radially inward protruding direction by a predetermined amount relative to a predetermined amount of mixer lobe radial penetration.

17. A method for reducing jet noise emission from an internally mixed gas turbine engine exhaust, comprising:
   selectively aligning a circumferential distribution of a mixed flow vorticity field produced by an internal double-lobe mixer used for mixing a core flow and a bypass fan flow, with a circumferentially distributed exhaust flow vorticity field produced by a tab nozzle at an exit plane of the engine exhaust, with radial and circumferential positioning of the elements of the internally-generated vorticity field relative to those of the externally-generated vorticity field such that the noise-reduction benefit of the two-stage mixing process is optimized.

18. The method of claim 17, comprising providing a lobe mixer as the fan/core mixer, and providing a selective geometric alteration of an aft end of the nozzle to generate the exhaust flow vorticity field.

19. The method of claim 18, wherein the lobe mixer is a double-lobe mixer.

20. The method of claim 18, wherein providing the selective geometric alteration of the aft end of the nozzle comprises forming a plurality of tabs, and orienting at least some of the tabs in a selected range between a radially inward-protruding direction and a radially outward-protruding direction.

21. The method of claim 20, comprising providing a plurality of tabs on the nozzle that is equal to a plurality of major lobes of the lobe mixer.

22. The method of claim 21, comprising clocking each one of the plurality of tabs with a corresponding one of the plurality of lobes between an alignment range of 0° to 360°, where 0° and 360° represent a tab tip to a lobe peak alignment and 180° represents a tab tip to lobe valley alignment.

23. The method of claim 22, comprising aligning each one of the plurality of tab tips with a corresponding mixer major lobe peak.

24. The method of claim 22, comprising aligning each one of the plurality of tab tips with a corresponding mixer major lobe valley.

25. The system of claim 14 wherein the internal mixed flow streamwise vorticity and the tab nozzle-induced streamwise vorticity are in the same rotational directions.

26. A method of claim 15 wherein the flow mixer streamwise vorticity and the exhaust flow streamwise vorticity are in the same rotational directions.

* * * * *